(12) United States Patent
Silverstone

(10) Patent No.: US 10,909,249 B2
(45) Date of Patent: *Feb. 2, 2021

(54) PROTECTING COMPUTING DEVICES FROM UNAUTHORIZED ACCESS

(71) Applicant: Computer Protection IP, LLC, Cumming, GA (US)

(72) Inventor: Ariel Silverstone, Redmond, WA (US)

(73) Assignee: COMPUTER PROTECTION IP, LLC, Cumming, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,051

(22) Filed: Jul. 23, 2019

(65) Prior Publication Data

US 2020/0012795 A1 Jan. 9, 2020

Related U.S. Application Data

(60) Continuation of application No. 16/168,517, filed on Oct. 23, 2018, now Pat. No. 10,402,568, which is a continuation of application No. 15/939,802, filed on Mar. 29, 2018, now Pat. No. 10,140,452, which is a division of application No. 14/937,315, filed on Nov.

(Continued)

(51) Int. Cl.
| | | |
|---|---|---|
| *G06F 21/57* | (2013.01) | |
| *G06F 21/55* | (2013.01) | |
| *H04L 29/06* | (2006.01) | |
| *G06F 21/53* | (2013.01) | |
| *G06F 21/60* | (2013.01) | |

(Continued)

(52) U.S. Cl.
CPC ........ *G06F 21/575* (2013.01); *G06F 9/45558* (2013.01); *G06F 21/44* (2013.01); *G06F 21/53* (2013.01); *G06F 21/554* (2013.01);

*G06F 21/602* (2013.01); *H04L 63/08* (2013.01); *H04L 63/20* (2013.01); *G06F 2009/45587* (2013.01); *G06F 2221/033* (2013.01)

(58) Field of Classification Search
CPC .... G06F 21/575; G06F 9/45558; G06F 21/44; G06F 21/53; G06F 21/602; H04L 63/08; H04L 63/20
See application file for complete search history.

(56) References Cited

U.S. PATENT DOCUMENTS

| 8,468,591 B2 | 6/2013 | Silverstone |
| 10,140,452 B2 | 11/2018 | Silverstone |

(Continued)

*Primary Examiner* — Oleg Korsak
(74) *Attorney, Agent, or Firm* — Smith Tempel Blaha LLC; Gregory Scott Smith

(57) ABSTRACT

Methods and systems for performing an authenticated boot; performing a continuous data protection; performing automatic protection and optionally a consolidation; and performing other defenses and protection of a protected computing device (such as a computer system) are provided. The aspects include integrating security mechanisms (which may include a "call home" function, role and rule-based policies, validating technologies, encryption and decryption technologies, data compression technologies, protected and segmented boot technologies, and virtualization technologies. Booting and operating (either fully or in a restricted manner) are permitted only under a control of a specified role-set, rule-set, and/or a controlling supervisory process or server system(s). The methods and systems make advantageous use of hypervisors and other virtual machine monitors or managers.

20 Claims, 4 Drawing Sheets

Related U.S. Application Data

10, 2015, which is a division of application No. 13/917,092, filed on Jun. 13, 2013, now abandoned, which is a continuation of application No. 12/514,222, filed as application No. PCT/US2007/081386 on Oct. 13, 2007, now Pat. No. 8,468,591.

(60) Provisional application No. 60/939,394, filed on May 22, 2007, provisional application No. 60/829,346, filed on Oct. 13, 2006.

(51) Int. Cl.
*G06F 9/455* (2018.01)
*G06F 21/44* (2013.01)

(56) References Cited

U.S. PATENT DOCUMENTS

| | | |
|---|---|---|
| 2013/0305348 A1 | 11/2013 | Silverstone |
| 2016/0078230 A1 | 3/2016 | Silverstone |
| 2018/0268147 A1 | 9/2018 | Silverstone |
| 2019/0065753 A1 | 2/2019 | Silverstone |

PROTECTING COMPUTING DEVICES FROM UNAUTHORIZED ACCESS

CROSS-REFERENCE TO RELATED APPLICATIONS

This is a continuation of U.S. patent application Ser. No. 16/168,517 filed on Oct. 23, 2018, which application is a continuation of U.S. patent application Ser. No. 15/939,802 filed Mar. 29, 2018 entitled "PROTECTING COMPUTING DEVICES FROM UNAUTHORIZED ACCESS", which application is a divisional application of U.S. patent application Ser. No. 14/937,315, filed Nov. 10, 2015 entitled "Client Authentication and Data Management", which is a divisional application of U.S. patent application Ser. No. 13/917,092, filed Jun. 13, 2013 entitled "Client Authentication and Data Management", now abandoned, which is a continuation application of U.S. patent application Ser. No. 12/514,222 filed May 8, 2009, entitled "Client Authentication and Data Management", now U.S. Pat. No. 8,468,591, which application claims the benefit of PCT Application No. PCT/US2007/081386, filed Oct. 13, 2007, entitled "Client Authentication and Data Management System", which application claims the priority to U.S. Provisional Patent Application Ser. No. 60/829,346, entitled "Secure Mobile Environment", filed Oct. 13, 2006 and U.S. Provisional Patent Application Ser. No. 60/939,394, entitled "Client Authentication and Data Management System Using Hypervisor Controller", filed May 22, 2007, each of which is incorporated herein by reference as if set forth herein in its entirety.

TECHNICAL FIELD

The present invention relates generally to data protection, and more particularly to a centrally-managed data protection system for use with computers and in computer systems, and more specifically, (i) systems and methods for protecting individual computing devices (e.g., desktops, laptops, cell phones, PDAs) or confidential, sensitive, or other proprietary data stored thereon from unauthorized access, (ii) systems and methods for enabling the recovery of data when such computing devices are lost or stolen or rendered inoperable and (iii) systems and methods for enabling the communication, in real-time or otherwise, between hypervisors and one another, many others, or other control and any computer device. Such systems and methods, optionally, can take advantage of hypervisor technologies, as described herein.

BACKGROUND

Businesses and users are increasingly storing corporate, confidential, or sensitive data on personal digital assistants (PDAs), mobile phones, laptops, and other mobile devices that are not properly protected within the confines of a secure building or secure network at all times. Without the proper data protections, a thief has potential access to sensitive information, such as corporate financial data, word documents, and private client information stored on such mobile devices. The value of the lost or stolen data is typically much higher than the value of the physical asset upon which it is stored. Even within the confines of a secure building, there are reasons and needs to protect and to be able to recover sensitive information stored on desktops, laptops, PDAs, mobile phones, and other computing devices (hereinafter, collectively, "computing devices").

Protecting and securing data is also a high legislative priority, as evidenced by numerous laws that have been passed by Congress for many industries. For example, in the financial industry, the Gramm-Leach-Bliley Act addresses the collection and disclosure of personal financial information by financial institutions. It requires all financial institutions to design, implement, and maintain safeguards to protect customer information. A customer's confidential and financial electronic documents are usually maintained in a storage database. The database security compliance obligations required by the Act include continual monitoring of data and the review and management of permissions granted to the database. Other laws and regulations such as Payment Card Industry security protection initiative, the Health Insurance Portability and Accountability Act, Sarbanes-Oxley Act, Canadian Personal Information Protection and the Electronic Documents Act require information protection and strict security for electronic documents.

Further, most organizations do not have policies or procedures to effectively implement disaster recovery for computing devices that are lost, stolen, or that are disabled. Typically, a user has to initiate and take affirmative actions to backup data to a separate data storage medium, such as DVD, memory chip, or network storage device. This process is inefficient, time consuming, and only sporadically followed. Because every user of a computing device does not backup stored data on a regular or frequent enough basis, information may not be recoverable if the computing device is lost, stolen, or destroyed. If this happens, the organization loses not only hardware and software, which are typically replaceable, but essential data that has not been backed up, which may not be as easily, if at all, replaceable.

For all of the above reasons, there is a need for systems and methods to protect sensitive, confidential, or important information from foreseeable threats or loss.

There is a further need for systems and methods that provide access control to computing devices, especially when they are "in the field" and not within a secure or protected environment, wherein such systems and methods include some or all of the following capabilities: authentication, authorization, reporting, compliance-checking, remotely controlling, communicating, controlling bandwidth and computing resource usage, monitoring user actions, allowing and disallowing any and all input and output methods per flexible criteria (which may include, but are not limited to: content, name, date, timestamp, user, type), logging, addressing, powering up and down, sharing, collaborating and auditing protocols.

There is a need for systems and methods to protect and backup corporate and confidential data stored on computing devices associated with an enterprise.

There is a need for systems and methods that enhances privacy, security and disaster readiness for an organization's computing devices.

There is a further need for systems and methods providing centralized management, security, and backing-up of computing devices.

There are further needs for systems and methods that facilitate the transfer and storage of data from a computing device in a secure and efficient manner.

There is yet a further need for systems and methods for providing centralized management that incorporates off-site back-up recovery, computing device data recovery, end point protection, disk encryption, device disablement, post theft protection, and data leak protection

BRIEF SUMMARY

The present systems and methods, which will sometimes be referred to as "Kylie™" or "Cosmos™" hereinafter, includes computer hardware and software components that enhance privacy, security, and disaster readiness for an organization's computing assets and, in particular, mobile assets. This, in effect, turns computing assets into "green terminals" from a security consideration point of view.

A "green terminal" is a type of terminal that consists of a keyboard and a display screen that can be used to enter and transmit data to, or display data from, a central processing computer to which it is connected. The present invention incorporates specified data or information on the computing device into an encrypted, protected "Realm" that, in one preferred embodiment, is not accessible by the device unless the device and a specified remote authentication server authenticate to each other.

As used herein, the term "Realm" means and refers to a concept of associated computing devices, that can be dynamically created, managed and controlled by, for example, an enterprise. The term Realm is created to define a logical affinity, rather then the well known terms "domain" and "workgroup."

On the other hand, the protected data that falls within the Realm is easily and readily available to the device (and potentially to the enterprise that owns the device) when certain considerations are met. In a preferred embodiment, these considerations do not require any hardware token of any kind and provide intermittent backup of the contents of the computing device, to protect against a disaster, theft, or other loss. The present systems and methods block unauthorized access to confidential or sensitive data stored on the computing devices or assets of, as an example, an enterprise. The present systems and methods also enable the rapid recovery of data, ensure compliance with privacy laws, and extend and help manage enterprise data policies, including and not limited to data protection policies.

One embodiment provides a system for protecting computing devices and associated secure data stored in at least one secure data storage component from unauthorized access, the system comprising at least one protected computing device configured for communication through a network with a storage controller to access the secure data, the protected computing device further configured for using a virtual machine, an authentication server configured for authenticating the protected computing device for access to the secure data; and a control console configured for access to devices connected to the network, wherein the control console is configured to exert control over the devices, wherein a virtual machine manager is launched during boot of the protected computing device, and wherein the virtual machine authenticates the computing device to the authentication server.

Another embodiment provides a method for protecting computing devices from unauthorized access, the method comprising: initiating a boot command of a protected computing device, wherein the boot command is configured to initiate the launch of an operating system, intercepting the boot command, launching a virtual machine prior to the operating system launch, at the virtual machine, authenticating the protected computing device to an authentication server, receiving at the virtual machine, a response from the authentication server, the response indicating the authentication status of the protected computing device, and causing the protected computing device to enter a specified state based on the authentication status of the protected computing device.

In one embodiment, the system performs an authenticated boot of a computer system using the thin layer of a virtual machine on a computing device. The virtual machine accepts a start instruction from the device upon which it is installed. The start instruction may be in the form of a power on, or a BIOS instruction, among others. It should be noted that the computing device may also be a mobile computing device, for example. Additionally, the computing device has an optional connection to other communication devices such as, for example, a centralized authentication server, or a replication or representation device thereof. An exemplary authentication server can be accessed through a gateway, or a proxy, among others. The virtual machine authenticates the validity of information within the device to the authentication server. Additionally, information provided by the user of the computing device can also be authenticated to the authentication server. Also, the authentication server is optionally authenticated to the computing device on which the virtual machine is installed using a two-way authentication protocol. Upon failure to authenticate, the booting process of the computing device is halted. Failure to authenticate can occur due to receiving a not-approve status, not receiving a reply, or not receiving a valid reply, among others. Upon successful connection and authentication, a bootstrap start is provided to the main (host) operating system.

Another embodiment provides a data processing system for an authenticated client including, a plurality of protected client devices, a plurality of server systems for providing authentication to the protected client devices, and a network connection between the protected client device(s) and the server system(s). Those of skill in the art will readily note that the network connection can be a temporary or permanent connection. Thus, the data processing system may provide client authentication with or without a network connection. An inner layer of a virtual machine on the computing device is maintained and/or for a predetermined interval. The interval is defined in the policies installed in the device, remotely downloaded from the authentication server, remotely downloaded from the enterprise control console, or entered by a user. The computing device continues normal operation of the "inner" machine and operating environment. While no longer connected and/or after the predetermined interval to disconnect, the computing device shuts down or takes other action to prevent the utilization of the "inner" machine and operating environment. Optionally, the computing device re-encrypts the protected "partitions." Of course, other specified areas of the storage medium can also be re-encrypted as necessary. Upon unsuccessful connection and/or authentication, the computing device potentially turns off, shuts down, and/or leaves the device in a state such that the protected information, and also the unprotected information, on the "main" portion of the computing device is left in an encrypted or otherwise unintelligible condition. Options for computing device handling of an unsuccessful connection and authentication are definable by the policies, for example provided by an enterprise, using the system and are limitless.

Another embodiment of the present invention uses a hypervisor to enable a system administrator to have centralized control over every function of the computing device. Such control is typically expressed by input/output (I/O) control, but is not limited to those. Additionally, the hypervisor can be used for enabling encryption and decryption for protected partitions. The hypervisor can also be used for enabling network access and control.

Another embodiment provides for encryption and decryption services for protected partitions on a computing device, and network access control are an optional part of the hypervisor's functionally. It should be noted however, that such functions could reside in the hypervisor, on the agent on top of the operating system, or elsewhere. Protected partitions are defined as files, protected areas, protected datasets, defined areas within a file system, physical drives, directories, bits, and areas of memory, among others. The information in a protected partition is protected from access by the hypervisor based on policies that include user-specific, group, subset, enterprise-specific, or some combination of the policies. At least four different modes of operation are provided: (1) native mode, (2) replication mode, (3) reconsolidation mode, and (4) no connectivity mode.

In another embodiment, a hypervisor is configured to communicate with a storage controller to monitor any changes in protected data. Secure or protected data on the computing device is backed up in real time or near real time according to pre-defined parameters. The backed up data is sent to the storage controller. The storage controller acts as a file server. Those of skill in the art will readily understand, however, that the storage controller could also act as a file server controller.

In yet another embodiment, the system enables periodic backup of data on the computing device. During an initial authentication, re-authentication procedure, set intervals, or a schedule as established by policies on the device, the hypervisor communicates with the remote authentication server to send modified data or updates to the storage controller associated with the authentication server.

In yet another embodiment, the system enables periodic backup of data on the computing device. During initial authentication, re-authentication procedure, set intervals, or a schedule as established by policies on the device, the hypervisor communicates with the remote authentication server to send the modified data or updates to the storage controller associated with the authentication server as above. Additionally, however, data from the computing device is indexed and stored in association with that particular device. The data is maintained for use, retrieval, and re-imaging onto another device upon loss, theft or damage to the original device. Additionally, the data storage also provides the enterprise with a central database of critical documents and information that is stored on devices throughout the enterprise.

In yet another embodiment, the system enables periodic backup of data on the computing device. During initial authentication, re-authentication procedure, set intervals, or a schedule as established by policies on the device, the hypervisor communicates with the remote authentication server to send the modified data or updates to the storage controller associated with the authentication server. Additionally, specified intervals can be configured for the hypervisor to communicate with the authentication server to authenticate the device. If the specific machine's credentials are expired or rendered invalid on the authentication server, the system can (1) prevent the machine operating or from continuing to operate and, depending upon policy can, (2) wait a certain interval and then shut down the machine, or (3) may encrypt, format or destroy the protected partitions and/or their contents.

In yet another embodiment, the system enables periodic backup of data on the computing device in conditions where there is no communication medium available for the computing device to access the authentication server. During initial authentication, re-authentication procedure, set intervals, or a schedule as established by policies on the device, the hypervisor communicates with the remote authentication server to send the modified data or updates to the storage controller associated with the authentication server as above. When connectivity is not possible, the device cannot be authenticated in real time. The policies for the hypervisor can either be set to prevent use of the device or, alternatively, the hypervisor allows the operating system to load. In replication mode, the user or enterprise allows sonic files to be copied or created into an unprotected area, and the user is permitted to read and write files into this unprotected area. In this replication mode, once the device is next able to communicate with the authentication server, and after the hypervisor authenticates, the files are copied into the protected partition. The original files remain in the unprotected area. The reconsolidation mode also allows some files to be copied or created into an unprotected area, and the user is permitted to read and write files into this unprotected area. Similarly, in the reconsolidation mode, once the device is next able to communicate with the authentication server, and alter the hypervisor authenticates, the files are copied into the protected partition. However, the files in the unprotected partition are securely automatically deleted after the files have been copied and saved into the protected partition or area. The "no connectivity" mode applies when there is no communication medium available for the device to access the authentication server or, alternatively, if the device is unable to authenticate but the enterprise wants the device user to have another means of authenticating to the enterprise. In the no connectivity mode, other means of generating authorization, such as, but not restricted to entering a password or other token, allow the device to continue and authenticate, and/or operate. If alternative means are made available, the system optionally includes safeguards against entry of multiple incorrect tokens. Additionally, operation of the device can be disallowed or prevented.

Yet another embodiment provides a data processing system for an authenticated client including, a plurality of protected client devices, a plurality of server systems for providing authentication to the protected client devices, and a network connection between the protected client device(s) and the server system(s). Those of skill in the art will readily note that the network connection can be a temporary or permanent connection. Thus, the data processing system may provide client authentication with or without a network connection. Additionally, a control console may be used to advantage by the enterprise or by a system operator to manage and control devices of the enterprise in an efficient and controlled manner. The control console can be used to assign policies to one or more devices within the enterprise based on any number of factors including, but not limited to, the identification of the user, the device location (present location or allowed location), the information stored on the device, and user access to the device, among others. For security reasons, policies established and pushed out by the control console to devices in the enterprise may take precedence over any policies that are hardwired or assigned directly on the device. The policies can be pushed out by the control console to a device as part of or during an initial authentication procedure during boot up. of the device, during any periodic re-authentication procedure required of the device, as part of the backup protocol, or as part of any standard re-authentication procedure mandated by the policies of the device. The system, with access to the hypervisor of-each device within the enterprise, enables the enterprise to push out software or policy updates, modifications, or changes, to install new programs, operating systems, or drivers, and to push out documents or other files, data, or information to the device, as needed.

In yet another embodiment, the hypervisor functionality allows each device within the enterprise to be linked together to any other device within the enterprise, through or by the control of the control console, the central authentication server(s), or another designated devise. The central authentication server(s), or another authorized device, can allocate memory, space, or network or processor bandwidth of one or more devices within the enterprise to any other one or more devices within the enterprise on an as needed, or as desired, basis. Further, the hypervisor on each machine can be used to communicate with hypervisors on one or more authorized machines to achieve efficiency, security, redundancy and other benefits that are inherent to communicative computer systems. Thus, one or more collaborative extensible hypervisor systems are created, which is analogous to a super computer and facilitates the notion of grid computing. This implementation has many benefits including, but not limited to, processing capability, collaboration, less servers, and efficiency. This reduces the amount of servers needed within an enterprise because the processing power of the CPU's of the computing devices of the enterprise are now available to the enterprise Other systems, methods, features and advantages of the present invention will be or become apparent to one with skill in the art upon examination of the following drawings and detailed description and supporting claims attached hereto. It is intended that all such additional systems, methods, features, and advantages be included within this description and be within the scope of the present disclosure.

BRIEF DESCRIPTION OF THE SEVERAL VIEWS OF THE DRAWING

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF EMBODIMENTS OF THE INVENTION

Figure 1:
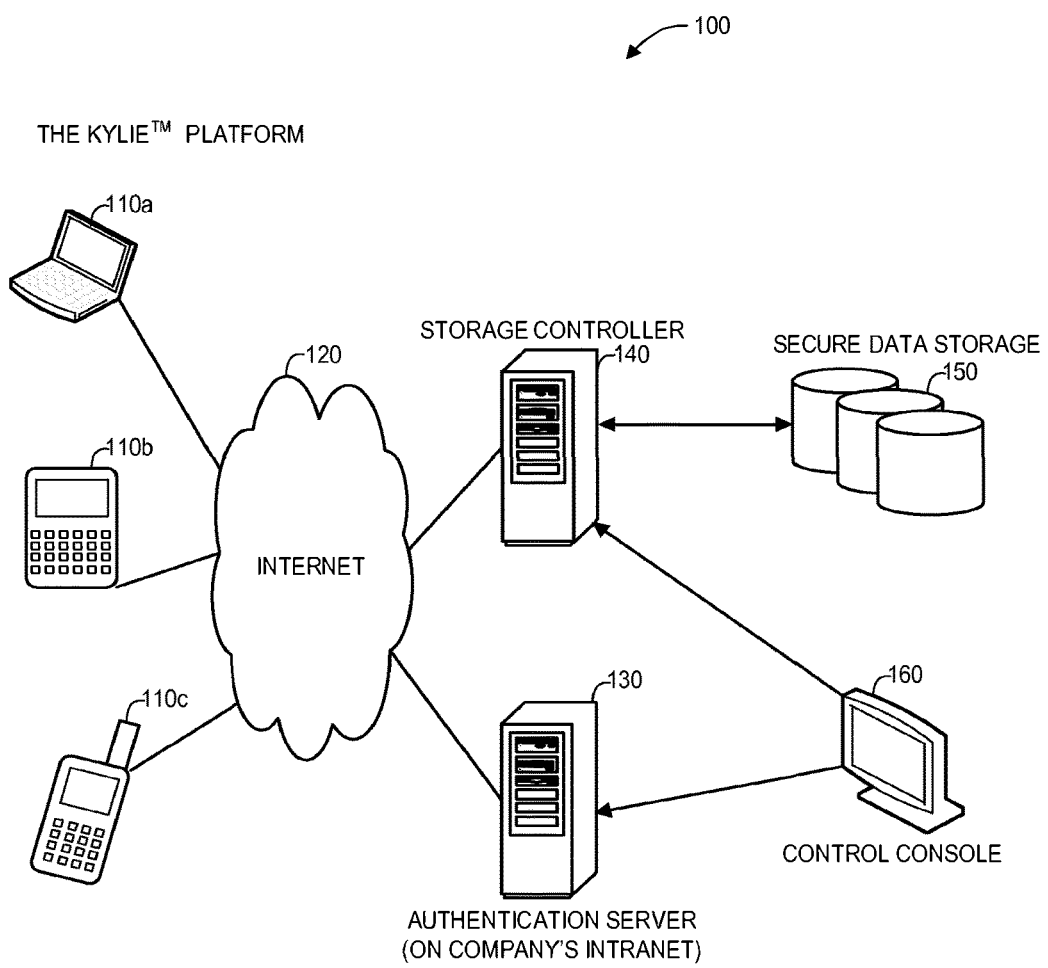
FIG. 1 is a system diagram illustrating a Kylie™ platform for protection of computing devices, backup and recovery of data, and communication with other computing devices.

Reference is now made in detail to the description of the embodiments of systems and methods for automatic configuration of a generic digital device on a wireless network as illustrated in the drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

The present invention uses a thin layer of a virtual machine on a computing device to protect computing devices (e.g., desktops, laptops, cell phones, PDAs, among others) or data (confidential, sensitive, proprietary) stored thereon from unauthorized access. Additionally, recovery of data is enabled when such devices are lost, stolen, or otherwise rendered inoperable. Further, communication is enabled (real-time or otherwise) between hypervisors and the computing device(s), or other control or computer device (s). Hypervisor technologies, as described herein, may optionally be utilized by the present invention.

In one embodiment, a thin layer of a virtual machine on a computing device accepts a "start" instruction from the device upon which it is installed. The start instruction can be in such forms as "power on," and "BIOS" instructions, among others. Alternatively, the thin layer of a virtual machine could be installed on a mobile computing device to provide significant additional benefits. Additionally, the computing device connects, via a choice from several available communication options, to another, possibly remote, centralized authentication server, or replication or representation device thereof (e.g., a gateway, proxy or such other terms). The computing device authenticates the validity of certain credentials installed within the device and/or provided by a user of the device to such server or gateway. Optionally, the computing device authenticates the server as well, in a two-way authentication protocol. Failure to communicate, optionally leads to halting the booting of the computing device. (Failure to communicate can be due to receiving a not-approve status, not receiving a reply, or not receiving a valid reply, for example.) Upon successful connection and authentication, the computing device provides a bootstrap start to the "main" operating system installed in the same or other "partition(s)" on the computing device, such as, but not limited to, drives or memory. (Partitions are discussed in further detail below.) This "inner" layer is stored in a manner optionally to provide (a) encryption of data therein, and/or (b) striping (as in a RAID technology) of data therein for purposes that include disaster recovery and encryption, among others. While this connection is maintained and/or for a predetermined interval thereafter (wherein the interval is, as non-limiting examples, defined in the policies installed in the device, is remotely downloaded from the authentication server or enterprise control console, or entered by a user), the computing device continues normal operation of the "inner" machine and operating environment. While no longer connected and/or after such predetermined interval to disconnect, the computing device shuts down or otherwise prevents the utilization of the "inner" machine and operating environment. Optionally, the computing device re-encrypts the protected "partitions." Upon unsuccessful connection and/or authentication, the computing device potentially turns off, shuts down, and/or leaves the device in a state whereby the protected information and also the unprotected information on the "main" portion of the computing device is left in an encrypted or otherwise unintelligible condition. Options for computing device handling of an unsuccessful connection and authentication are definable by the policies, for example provided by an enterprise, using the system and are limitless.

Preferably, the systems and methods of the present invention use a "hypervisor" to enable a system administrator to have centralized control over every-function of the computing device. Such control is typically expressed by input/ output (I/O) control, but is not limited to those.

A hypervisor is similar to, but slightly different from a "virtualization manager" or "virtual machine monitor" (VMM). A hypervisor is a software program or system layered between the device hardware and the operating system(s), if one or more are present. In a further embodiment of the current invention, a hypervisor is integrated into the circuitry installed on a device that allows one or more operating systems (which, for example, can include different operating systems or multiple instances of the same operating system or no operating system at all) to share a single hardware processor. Thus, a hypervisor is a virtualization platform that allows none, one, or more operating systems to run on a host computer at the same time. The term hypervisor usually refers to an implementation using full virtualization. Hypervisors have traditionally been used on servers to enable the server to run multiple operating systems simultaneously. It will be readily understood by one of skill in the art that a virtual machine (VM) includes a virtual machine monitor (also known as a virtual machine manager or VMM) and includes capability for monitoring, managing, and/or controlling a virtual machine.

Hypervisors are currently classified into several types. A type 1 hypervisor (or type 1 virtual machine monitor) is software that runs directly on a given hardware platform (as an operating system control program). A "guest" operating system thus runs at the second level above the hardware. The classic type 1 hypervisor was CP/CMS, developed at IBM in the 1960s, ancestor of IBM's current z/VM. Another type of hypervisor, called paravirtualization in Xen, a hypercall in Parallels Workstation, and a DIAGNOSE code in IBM's VM, is one that requires a guest operating system to be modified to make system calls to the hypervisor, rather than executing machine I/O instructions which are then simulated by the hypervisor. Recent examples include Xen, VMware's ESX Server, and Sun's Logical Domains Hypervisor (released in 2005). A type 2 hypervisor (or type 2 virtual machine monitor) is software that runs within an operating system environment. A "guest" operating system thus runs at the third level above the hardware. Examples include VMware server and Microsoft Virtual Server.

A hypervisor is a computer within a computer, implemented in software. It is a virtual machine that emulates a complete hardware system, including the video card, hard drive, network interface card, processor and memory. Therefore, the hypervisor controls the processor and manages the processors resources such as memory, input- and output, network interface, etc.

The systems and methods of the present invention take advantage of a hypervisor's capabilities for previously unused purposes, particularly when used on a device other than a server, such as, for example, a mobile computing device. In particular, the hypervisor can be programmed and configured to enable authentication of a computing device to a remote authentication server and to enable centralized control over every function of the computing device. Either or both can circumvent the traditional OS that may be installed on said device, and is described in greater detail hereinafter.

Typically, a hypervisor is designed for a particular processor architecture. Exemplary processors for which a hypervisor is designed include for example, the AMD processor with "Pacifica" (also known as AMD-V) and the Intel processor with VT-x and/or VT-d, among others. An AMD processor with Pacifica, for example, provides the capability to use virtualization software and a hypervisor, and wherein the, hypervisor is the host environment. The AMD Pacifica technology enables partitioning and memory access to and from the processing core. The AMD Pacifica technology distinguishes its processor technology from others by, among other reasons, integrating the memory controller into the processor. Memory controllers contain logic necessary to read and write dynamic random access memory. AMD-V virtualization technology introduces unique new instructions that enable memory modes and features exclusive to its design. Most of these instructions handle the memory management unit (MMU), which provides memory allocation. Under virtualization, the MMU can map multiple operating systems, running multiple applications linked to physical memory addresses. AMD-V offers advanced memory features, including Tagged Translation Look-Aside Buffers, which increase performance of this table of recently accessed memory pages by tagging them specifically to their virtual machines. This maximizes bandwidth and minimizes latency.

I. System Architecture

Turning now to FIG. 1, an overall view of a preferred system and major components that comprise the "Kylie™ Platform" system 100 are illustrated. Specifically, computing devices 110, such as a laptop computer 110a, a PDA 110b, a cell/mobile phone 110c, or desktop computer, are in communication, through the Internet 120 (or other conventional communication network, such as a wireless, cell phone, satellite, or broadband network), with an authentication server 130. Preferably, the computing devices 110 are also in communication with a storage controller 140 with access to one or more secure data storage components 150. Preferably, a control console 160, used by a system administrator, has access to each of the other components in the network and has the ability to monitor or exert control over such other components of the system, as will be described in greater detail herein. The system 100 typically includes at least one protected client, at least one server system serving as the authentication mechanism to the client(s), and a connection between at least two such systems. The connection can be temporary or permanent.

Figure 2:
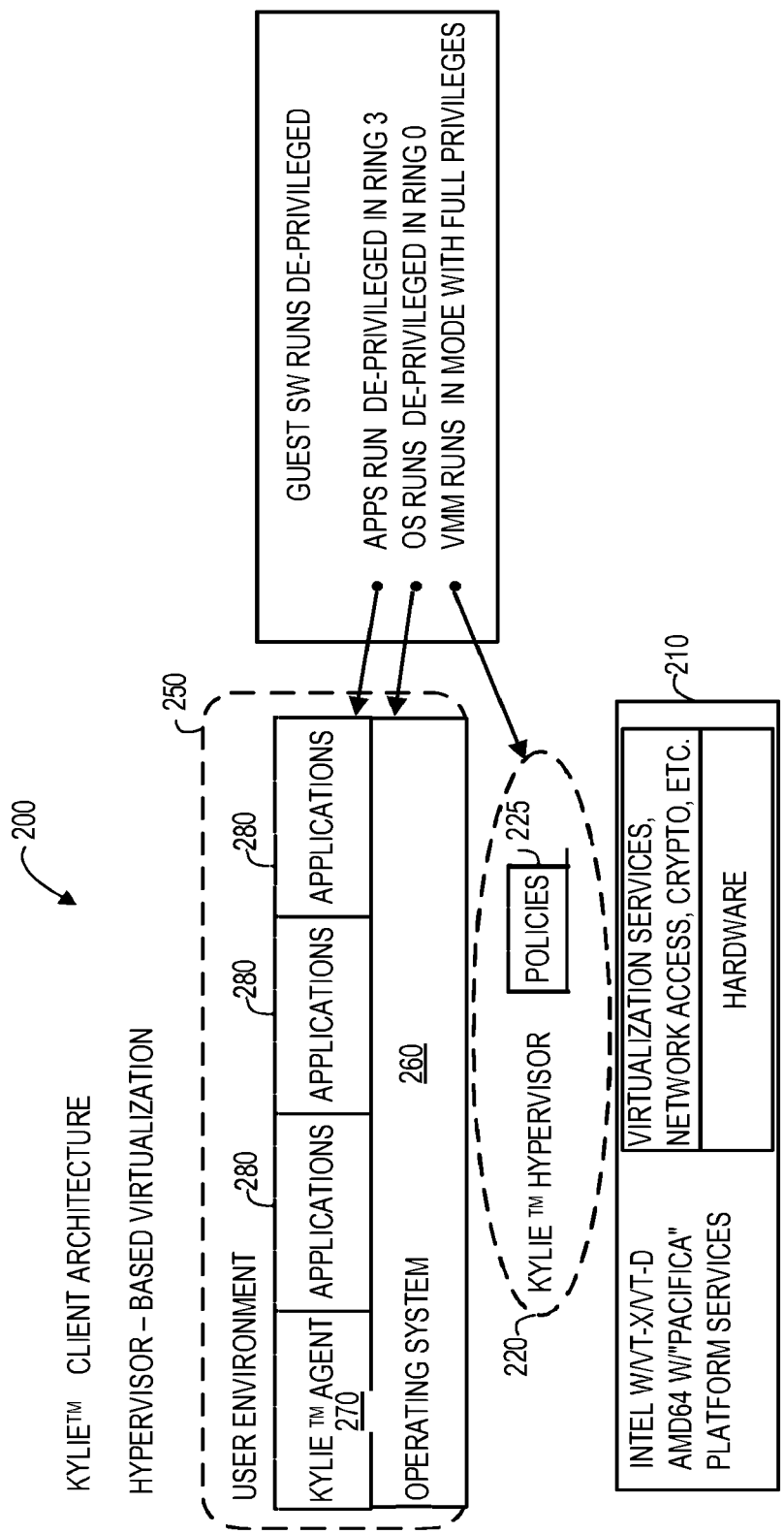
FIG. 2 is a diagram illustrating a client architecture for the system as in FIG. 1.

Turning now to FIG. 2, a simplified client architecture 200 installed on a computing device 100 is illustrated. The architecture includes, at its base level, a central processing unit (CPU) 210, such as an AMD w/"Pacifica" or Intel w/"VT-x" or "VT-d" with enhanced virtualization technology. Running on or in control by the CPU 210 is a hypervisor 220, suitably configured and having software programming controls based on the Kylie™ system 100. The configured hypervisor 220 includes a set of policies 225 that are configurable and having capability for use in a variety of manners, as described in greater detail hereinafter. (Exemplary hypervisor policies 225 are provided below.) Above the hypervisor 220, is a conventional user environment 250 of the computing device 110. Such user environment 250 may include a standard or conventional operating system (or more than one) (OS) 260 and any number of conventional software applications 280. Optionally, the user environment 250 also contains a Kylie™ Agent application 270 that provides additional functionality, such as continuous or on-going data backup and protection, as will be described in greater detail herein.

Encryption and decryption services for protected partitions and network access control are an optional part of the Kylie™ hypervisor's functionally. It should be noted however, that such functions could reside in the hypervisor, on the agent on top of the operating system, or elsewhere. Protected partitions are defined as files, protected areas, protected datasets, defined areas within a file system, physical drives, directories, bits, areas of memory, and the like. The information in a protected partition is protected from access by the hypervisor 220 based on its policies 225. Such information is also, optionally, backed up, indexed, and stored in the secure data storage components 150 within, for example, an enterprise storage system, again, based on the policies 225 of the configured hypervisor 220. As an example, The Kylie™ hypervisor could be optionally loaded for the hard drive, from the motherboard, resident in system memory, from the CPU or chipset directly or from another chip installed on the motherboard.

As noted above, exemplary hypervisor policies 225 include, but are not limited to groups including (I) authorization/authentication, (II) encryption, (III) device related, (IV) communications, (V) counters, and (VI) storage. Other hypervisor policies can and will flow from the control console 160.

The authorization/authentication group includes policies such as (1) auto-shutdown, (2) auto-format, (3) auto-dial home (VPN, Modem, LAN, WAN, or Cellular), and (4) persistent connectivity request, among others.

The encryption group includes policies such as (1) when to encrypt, (2) when to decrypt, (3) when to format, expunge, or destroy the drive in a DoD 5802 compliant manner, for example, (4) what to do if the drive is removed, (5) how to calculate checksums, CRC and other methods of proving no tampering, (6) encryption algorithm settings, and (7) fail-over encryption settings.

The device related group includes policies such as (1) device identity (which drive), (2) device identity (which computer), and (3) device identity (which NIC cards).

The communications group includes policies such as (1) preferred connection order (network type), (2) preferred connection order (network ip address range), (3) mandatory choice (of 1), (4) mandatory choice (of 2), (5) IP settings, (6) IPv6 settings, (7) notification server addresses, (8) gateway addresses, (9) storage addresses, (10) DNS addresses, (11) call home settings, (12) "Lojack" functionality settings, (13) bandwidth throttling settings, (14) CPU throttling settings, (15) control console addresses, preferred and secondary, (16) USB pathway decryption, (17) USB autodetect settings, (18) USB firewall settings, (19-21) pathway decryption, auto-detect, and firewall settings for CD/DVD drive, (22-24) pathway decryption, auto-detect, and firewall settings for LAN access, (25-27) pathway decryption, auto-detect, and firewall settings for floppy drive access, (28-30) pathway decryption, auto-detect, and firewall settings for printer access, (31-33) pathway decryption, auto-detect, and firewall settings for monitor access, (34-36) pathway decryption, auto-detect, and firewall settings for modem access, (37-39) pathway decryption, auto-detect, and firewall settings for hard disk drive access, (40-x) pathway decryption, auto-detect, and firewall settings for any I/O function on the machine, whether through CPU, network, bus, or other mechanism, (y) connectivity frequency default, (z) connectivity frequency fall-back, (a1) public signatures for recognized command consoles, (a2) public signatures for recognized storage controllers, (a3) public signatures for recognized master command console, and (a4) public signatures for recognized authentication gateways.

The counters group includes policies such as (1) connectivity attempts, (2) connectivity failures, (3) connectivity pathways, (4) next hop routers address storage, (5) boot cycles success, (6) boot cycles failure, (7) time running, (8) command transfer from management console, (9) data protection success, (10) data protection volume per session, and (22) data protection volume in total.

The storage group includes policies such as (1) compression ratio, (2) hardware protected area (HPA) addresses, (3) protected partition pointers (4) file system type, (5) changed data areas, (6) consolidation, (7) reconsolidation, (8) auto consolidation settings, (9) storage filter sets, and removal device control policies.

II. Process and Methodology

Figure 3:
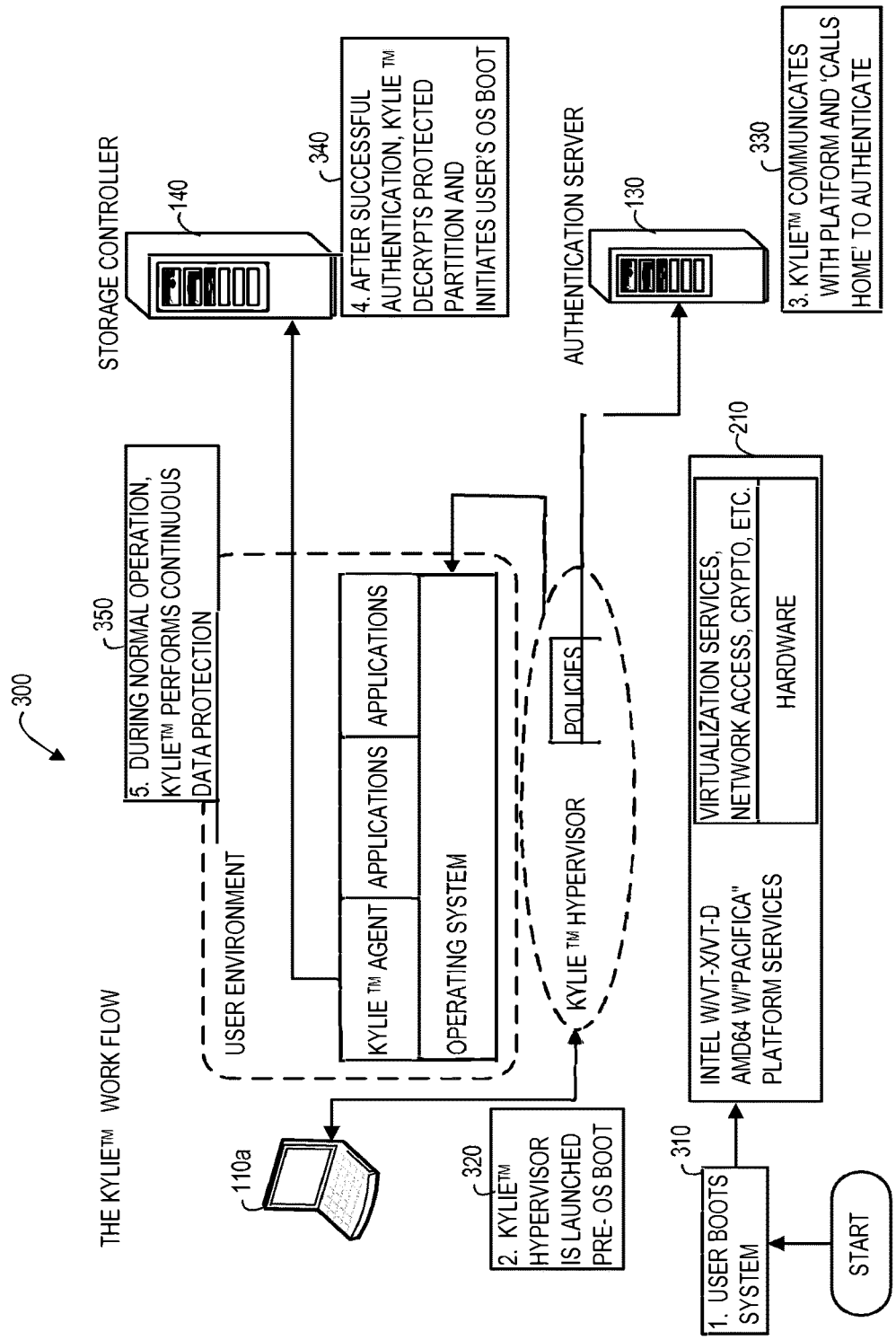
FIG. 3 is a diagram illustrating workflow for the system as in FIG. 1.
Figure 4:
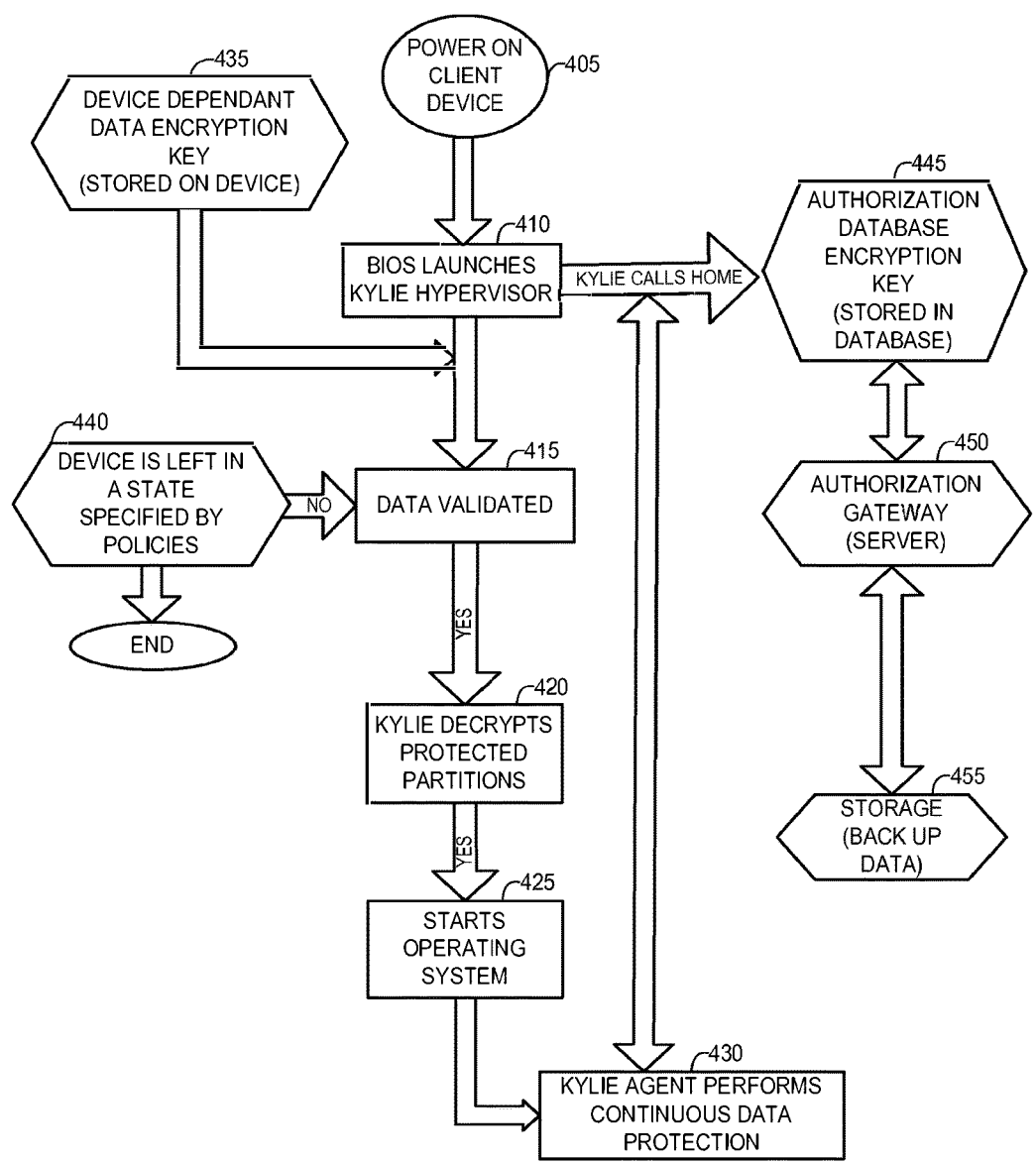
FIG. 4 is a workflow diagram illustrating the modes of operation for the system as in FIG. 1

FIG. 3 and FIG. 4 are workflow diagrams illustrating the Kylie™ workflow 300 for the Kylie™ platform system 100. Both FIG. 3 and FIG. 4 illustrate at least four exemplary modes of operation: (1) native mode, (2) replication mode, (3) reconsolidation mode, and (4) no connectivity mode. The user-specific, group, subset, or enterprise specific policies assigned to each computing device by the enterprise remain active during each mode.

Specifically, FIG. 3 illustrates the workflow as viewed in a system 100 setting. Operation begins with an initial boot of the computing device at step 310. The hardware initiates a call to the computing device 110 at step 320, and the call is intercepted by a virtual machine manager such as a hypervisor 220. After launch, the virtual machine manager 'calls home' to the authentication server 130 to authenticate the computing device 110 at step 330. The virtual machine manager determines whether the authentication passes or fails at step 340. Upon successful authentication, and as shown at step 350, the virtual machine manager, such as a hypervisor 220, performs continuous data protection during normal operation. This functionality is discussed in greater detail below in reference to FIG. 4.

FIG. 4 further illustrates different modes of operation for the system 100. The modes of operation are as indicated above and include at least (1) native mode, (2) replication mode, (3) reconsolidation mode, and (4) no connectivity anode.

A. Native Mode

1. Device Powered on

The user of a computing device 10, such as a laptop 110a, for example, initially boots the system at step 405 by powering on the CPU 210 or client computing device. This initiates the BIOS.

2. Kylie™ Hypervisor Physical Loading

At step 410, the hardware initiates a call to the computing device 110 and the call is intercepted by the Kylie™ hypervisor 220. Thus, the Kylie™ hypervisor 220 is launched before the OS boots.

3. Start-Up Authentication

After launch, the configured hypervisor 220 causes the computing device 110 to communicate with the authentication server 130 using a communication protocol installed on the device. At step 445, the Kylie™ hypervisor communicates with the platform and 'calls home' to authenticate. The hypervisor 220 enables this communication without using or launching the operating system installed on the computing device 110. It does this using a built-in or referenced communication stack.

The computing device 110 authenticates to an authentication server 130 using digital certificates or cryptographic keys. Optionally, the authentication server 130 authenticates to the computing device 110 also. As in step 435, the digital certificates and/or keys are exchanged or used to generate digital signatures between the computing device 110 and the authentication server 130 so that each device can verify the authenticity, validity, and currency, of the other device. The authentication process uses an authentication algorithm and uses, for example, passwords, public key encryption, or other known authentication mechanisms.

In a preferred embodiment, the authentication algorithm utilizes a 2048-Bit encryption key that is passed and hashed. In step 450, the authentication server 130 attempts to match the key in its authorization database, in step 455, to the known key that is stored on the device in a conventional "Challenge and Response" procedure.

4. Authentication Fails or Passes

Next, the Kylie™ hypervisor 220 determines whether the authentication passes or fails, at step 415. If authentication fails, it is assumed that the integrity of the digital certificate is compromised, and is unrecognizable and invalid to the authentication server 130. For example, if Kylie™ has been modified in the boot sector of the computing device 110 associated with an enterprise, the device will not continue the boot process. In a preferred embodiment, there are a set of policies 225 or rule sets built into the Kylie™ hypervisor 220. As indicated in step 440, in the event authentication fails, the policies 225 assigned, for example, by the enterprise determine what state the device will enter upon a failed authentication. For example, if the device is a GSM wireless phone associated with an enterprise and fails to authenticate, the policy optionally specifies "destroy the SIM".

Another policy example is "shut down the computer." The enterprise can configure, using the policies installed on a particular computing device 110, or based on the policies installed on all devices of the enterprise, or of a specific user or group of users, the resulting action to the computing device due to an initial failure to authenticate. (Exemplary hypervisor policies that can be implemented in the hypervisor are described above.) The options for what occurs upon a failure to authenticate are essentially limitless.

After successful authentication, the Kylie™ hypervisor 220 decrypts the protected partitions on the computing device 110, at step 420, and the standard operating system(s) of the device, if any, is (are) launched at step 425. The computing device 110 remains subject to the policies implemented by, for example, the enterprise.

5. Continuous Data Protection and Backup

Advantageously, the hypervisor 220 or the Kylie™ agent application is also able optionally to perform continuous data protection (CDP), an advanced form of backup and recovery. As shown at step 430, the hypervisor 220 performs continuous data protection during normal operation. For example, at a regular interval, the hypervisor 220 or Kylie™ agents can be configured to communicate with the storage controllers 140. It monitors any changes in the protected data. The system 100 backs up the secure or protected data that is on the computing device 110 in real time or near real time per pre-defined parameters and sends the modified data to the storage controller 140. In a preferred embodiment, the storage controller 140 acts as a file server. Those of skill in the art will readily understand, however, that the storage controller could also act as a file server controller.

In another feature, the present system 100 enables periodic backup of data on the device. During an initial authentication, re-authentication procedure, or during set intervals or schedule as established by policies on the device, the hypervisor 220 communicates with the remote authentication server 130 to send modified data or updates to the storage controller 140 associated with the authentication server 130. The data is indexed and stored in association with the particular device. Not only can such data be maintained for use, retrieval, and re-imaging onto a new device upon loss, theft or damage to the original device, but such data storage also provides the enterprise with a central database of critical documents and information that is stored on devices throughout the enterprise.

6. Continuous Monitoring of Valid (Non-Compromised) State

Specified intervals can be configured for the hypervisor 220 or Kylie™ agents to communicate with the authentication server 130 to authenticate the device. If the specific machine's credentials are expired or rendered invalid on the authentication server, as validated at step 415, the system 100 can prevent the machine operating or from continuing to operate, and, depending upon policy can, wait a certain interval, shut down the machine and/or encrypt or format the protected partitions, as in step 440.

B. Replication Mode

Replication mode allows the operating system to load and for specified files to be copied or created into an unprotected area. In certain situations, no communication medium is available for tie device to access the authentication server 130 as, for example, when the device is on a plane or in an area in which there is no wired or wireless connectivity. When connectivity is not possible, the device cannot be authenticated in real time. The policies for the hypervisor 220 can either be set to prevent use of the device at all or, alternatively, in replication mode, the hypervisor 220 allows the operating system to load. The user or enterprise allows some files to be copied or created into the unprotected area, and the user is also permitted to read and write files into this unprotected area. In replication mode, once the device is next able to communicate with the authentication server 130, and after the hypervisor 220 authenticates, the files are copied into the protected partition. The original files remain in the unprotected area. This mode is dependent upon the policies assigned to the computing device by, for example, the enterprise.

C. Reconsolidation Mode

This reconsolidation mode is similar to the replication mode in that the user or enterprise allows some files to be copied or created into an unprotected area, and the user is permitted to read and write files into this unprotected area. Similarly, in reconsolidation mode, once the device is next able to communicate with the authentication server 130, and after the hypervisor 220 authenticates, the files are copied into the protected partition. However, the files in the unprotected partition are securely automatically deleted after the files have been copied and saved into the protected partition or area.

D. No Connectivity and Device is Unable to Authenticate Mode

The no connectivity mode applies when there is no communication medium available for the device to access the authentication server 130 or, alternatively, if the device is unable to authenticate but the enterprise wants the device user to have another means of authenticating to the enterprise. The enterprise can set a policy to enable the use of alternative means to authenticate and gain access to the protected areas of the device. As above, the user or enterprise allows some files to be copied or created into an unprotected area, and the user is permitted to read and write files into this unprotected area. In the no connectivity mode, other means of generating authorization, such as, but not restricted to entering a password or other token, allow the device to continue and authenticate, and/or operate. If alternative means are made available, the system 100 optionally includes safeguards against entry of multiple incorrect tokens. Additionally, operation of the device can be disallowed or prevented.

In one embodiment (if Internet connectivity is available), the hypervisor 220 launches a specified display, possibly in the form of a webpage that provides a phone number or email address for the user to obtain a code or to receive an email authorization to authenticate the device. If Internet connectivity is not available, the hypervisor 220 can be programmed to display a phone number for the user to call to present suitable credentials and to authenticate to the device outside of the standard authentication used by the device and authentication server 130. The user then enters the code or number provided by the phone call or email and, if the number matches pre-defined criteria stored in the hypervisor 220, the device is able to boot its operating system and provide, optionally, access to the protected areas or data on the device. If the number does not match after some specified but limited number of attempts, the enterprise can establish a policy and program the hypervisor 220 to act in a desired manner (i.e., not boot, boot but not provide access to protected areas of or protected information on the device, prevent further start-up attempts, disable the device, etc.).

III. Other Features and Aspects

The following are additional features and aspects of the present invention and are enabled by use of the hypervisor 220 as discussed above.

Specifically, a control console 160 may be used to advantage by the enterprise or by a system operator to manage and control devices of the enterprise in an efficient and controlled manner. The control console 160 can be used to assign policies 225 to one or more devices within the enterprise based on any number of factors including, but not limited to, the identification of the user, the device location (present location or allowed location), the information stored on the device, user access to the device, and the like. For security reasons, policies 225 established and pushed out by the control console 160 to devices in the enterprise may take precedence over any policies 225 that are hard-wired or assigned directly on the device. Such policies can be pushed out by the control console 160 to a device as part of or during an initial authentication procedure during boot up of the device, during any periodic re-authentication procedure required of the device, as part of the backup protocol, or as part of any standard re-authentication procedure mandated by the policies 225 of the device.

Advantageously, the system 100, with access to the hypervisor 220 of each device within the enterprise, enables the enterprise to push out software or policy updates, modifications, or changes, to install new programs, operating systems, or drivers, and to push out documents or other files, data, or information to the device, as needed. The frequency of such updates is governed solely by how often the hypervisor policies 225 require the device to authenticate or re-authenticate with the remote authentication server 130. Upon any contact or communication by the device with the authentication server 130, such information can be pushed out and required to be accepted or installed on the device as part of the continuing authorization provided to the hypervisor 220 by the authentication server 130 for the device to function properly or normally.

In another embodiment, each device within the enterprise can be linked together through or by the central authentication server(s) 130 through the hypervisor functions. The central authentication server(s) 130 can allocate memory, space, network or processor bandwidth of one or more devices within the enterprise to any other one or more devices within the enterprise on an as needed or as desired basis. Further, the hypervisor 220 on each machine can be used to communicate with hypervisors 220 on one or more authorized machines to achieve efficiency, security, redundancy and other benefits that are inherent to communicative computer systems. Doing so, in one embodiment, creates one collaborative extensible hypervisor system, which is analogous to a super computer and facilitates, in certain embodiments, the computing Grid notion. This implementation has many benefits including for example, processing capability, collaboration, less servers, and efficiency. This reduces the amount of servers needed within an enterprise because the processing power of the CPU's of the computing devices of the enterprise are now available to the enterprise.

In another embodiment, the hypervisor 220 enables a system administrator to have centralized control over every function of the computing devices 110 within an enterprise. This level of functionality centralizes communications, control, support, and enhances security along with the traditional features of virtualization. Additional features include reduced boot time, central manageability, encryption adjustable from hard drive/partition/folder/file/type, immediate and continuous back-ups, remote back-up capability, local restore capability, remote restore capability, and remote policy extension. Further, there is no need for a physical key, and no need for a TPM chip. Further features include remote computer look-up capability, remote expunge capability (remote formatting), Lojack, forced security option, asset management, reduced need for a local firewall, centralized data search capability, retention of company-compliant user authentication mechanisms, and is virtually invisible to the user. Finally, additional features also include zero learning curve, simple distribution, create a secure pathway to corporate intranet, works on desktops, works on laptops, works on cell phones, exports to OpenView, Tivoli, XML, SMTP, and SNMP, and other such standard formats, and provides corporate data recovery ability.

Accordingly, it will be understood that various embodiments of the present invention described herein are preferably implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable to through wireless communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable nonvolatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions will be described in the general context of computer-executable instructions, such as program modules, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAM, ROM, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, or other input devices (not shown), such as a microphone, game pad, satellite dish, scanner, or the like. These and other input devices are often connected to the processing unit through known electrical, optical, or wireless connections.

The main computer that affects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless networks, including cellular, WiFi, WiMax, and other networks, that are presented here by way of example and not limitation. Such networking environments are commonplace in office-wide or enterprise-wide computer networks, intranets and the Internet.

When used in a LAN or wireless networking environment, the main computer system implementing aspects of the invention is connected to the local network through a network interface or adapter. When used in a WAN or wireless networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A mobile device comprising:
   a central processing unit (CPU);
   a basic input/output system (BIOS) executable by the CPU;

an operating system that provides a user environment for the mobile device to support at least one software application;

a memory partition configured to store protected data comprising at least a portion of the operating system;

a digital signature used by the mobile device to verify the authenticity of the operating system prior to the operating system being securely booted from the memory partition;

a hypervisor configured to perform periodic data protection of the protected data by monitoring for a change in the protected data while the operating system is executed.

2. The mobile device of claim 1, wherein the operating system is prevented from booting in response to the authenticity being unverified.

3. The mobile device of claim 1, wherein memory partition is encrypted and wherein the memory partition is decrypted prior to launching the operating system.

4. The mobile device of claim 1, further comprising a storage controller, wherein the hypervisor is configured to communicate with the storage controller to monitor for a change in the protected data while the operating system is executed.

5. The mobile device of claim 1, wherein the hypervisor is launched prior to the operating system being securely booted.

6. The mobile device of claim 1, further comprising an unprotected memory partition configured to store files accessible to the operating system.

7. A mobile device comprising:
a central processing unit (CPU);
a basic input/output system (BIOS) executable by the CPU;
an operating system that provides a user environment for the mobile to support at least one software application;
a memory partition configured to store data accessible to the operating system;
a digital signature used by the mobile device to verify the authenticity of the operating system prior to the operating system being securely booted;
a virtual machine manager configured to perform periodic data protection of the protected data by monitoring for a change in the protected data while the operating system is executed.

8. The mobile device of claim 7, wherein the operating system is prevented from booting in response to the authenticity being unverified.

9. The mobile device of claim 7, wherein memory partition is encrypted.

10. The mobile device of claim 7, further comprising a storage controller, wherein the virtual machine manager is configured to communicate with the storage controller to monitor for a change in the protected data while the operating system is executed.

11. The mobile device of claim 7, wherein the virtual machine manager is launched prior to the operating system being securely booted.

12. The mobile device of claim 7, further comprising an unprotected memory partition configured to store files accessible to the operating system.

13. The mobile device of claim 7, wherein the virtual machine manager comprises a hypervisor.

14. A system comprising:
a central processing unit (CPU);
an operating system that provides a user environment to support at least one software application;
a memory area configured to store data accessible to the operating system;
a digital signature used to verify the authenticity of the operating system to determine whether the operating system should be booted;
a virtual machine manager configured to perform periodic data protection of the protected data by monitoring for a change in the protected data while the operating system is executed.

15. The system of claim 14, wherein the system is implemented in a cell phone.

16. The system of claim 14, wherein memory partition is encrypted.

17. The system of claim 14, further comprising a storage controller, wherein the virtual machine manager is configured to communicate with the storage controller to monitor for a change in the protected data while the operating system is executed.

18. The system of claim 14, wherein the virtual machine manager is configured to determine whether the operating system should be booted by using the digital signature.

19. The system of claim 14, further comprising an unprotected memory partition configured to store files accessible to the operating system.

20. The system of claim 14, wherein the virtual machine manager comprises a hypervisor.

* * * * *